(12) United States Patent
Hayes et al.

(10) Patent No.: US 7,670,227 B2
(45) Date of Patent: Mar. 2, 2010

(54) CHANGEABLE CONSOLE FACE PLATE

(75) Inventors: Jonathan A. Hayes, Seattle, WA (US);
Jeffrey M. Reents, Carnation, WA (US);
William J. Lauby, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 11/026,913

(22) Filed: Dec. 30, 2004

(65) Prior Publication Data

US 2006/0148578 A1 Jul. 6, 2006

(51) Int. Cl.
*A63F 13/00* (2006.01)
(52) U.S. Cl. ....................................................... 463/47
(58) Field of Classification Search .................. 463/47; D14/506; 361/679.39; 370/205; 386/125; 709/250
See application file for complete search history.

(56) References Cited

U.S. PATENT DOCUMENTS

| | | | | |
|---|---|---|---|---|
| 6,803,676 B2* | 10/2004 | Tanaka et al. | ................. | 307/28 |
| 2002/0149905 A1* | 10/2002 | Jackson, Jr. | ................. | 361/681 |
| 2003/0011973 A1 | 1/2003 | Jeong | | |
| 2004/0062172 A1* | 4/2004 | Huang | ....................... | 369/75.1 |
| 2004/0172641 A1 | 9/2004 | Saito | | |
| 2005/0088814 A1* | 4/2005 | Jobs et al. | ................... | 361/683 |
| 2005/0243505 A1* | 11/2005 | Jackson, Jr. | ................. | 361/683 |
| 2005/0262226 A1* | 11/2005 | Holloway et al. | ........... | 709/221 |
| 2006/0107295 A1* | 5/2006 | Margis et al. | ................. | 725/81 |

FOREIGN PATENT DOCUMENTS

| | | |
|---|---|---|
| CN | 2490619 Y | 5/2002 |
| DE | 9302847 U1 | 4/1993 |
| DE | 202004010669 U1 | 11/2004 |
| JP | 62231762 | 9/1988 |

* cited by examiner

*Primary Examiner*—Peter DungBa Vo
*Assistant Examiner*—Masud Ahmed
(74) *Attorney, Agent, or Firm*—Woodcock Washburn LLP (57) ABSTRACT

A console includes a face plate that is removably mounted to a console body by at least one clip. The face plate includes a power button for turning on the console. The face plate further includes a DVD slot that provides access to a DVD tray and a DVD ejection button mounted on the console body. The face plate may include additional features as desired. The ability to readily remove the face plate allows users to switch between a first face plate with a first set of graphics to a second face plate having a second set of graphics. Thus, a console is provided with increased user customizability.

16 Claims, 11 Drawing Sheets

FIG. 11

CHANGEABLE CONSOLE FACE PLATE

BACKGROUND OF THE INVENTION

1. Field of the Invention

The present invention relates to the field of home entertainment, more specifically to the field of high performance consoles for use in home entertainment.

2. Description of Related Art

The use of microprocessors for the purpose of home entertainment such as playing video games is known. Prior to the advent of microprocessors, the playing of games required the use of dice and/or interaction with a game board. The introduction of the microprocessor changed the face of playing games by allowing game makers to create images on a television screen (which will be called a monitor) and through various input devices, let people interact with the images on the monitor.

Initial efforts, while enjoyable to many, were somewhat crude with respect to the graphics displayed. Thus, an individual playing a game did not often feel as if part of the game but rather an outsider watching the poorly defined objects move around in response to input via a controller.

As microprocessors increased in power, increasingly complex video games became possible. The graphical quality of video games also improved to the point that gaming has become relatively immersive. In addition, the increase in availability of higher speed connections to the Internet has allowed for game play over the Internet. Massively multi-player online role playing games ("mmorpg") where numerous individuals log onto a server and play in a virtual world have become popular, allowing many individuals to play the same game at the same time. Other online gaming involves team play or competitive play versus other players. For example, X-BOX LIVE™ provides an opportunity to play with or against friends in a variety of different gaming formats.

As the number of people playing games increases, however, a certain amount of uniqueness is lost for any individual player playing a game. For instance, with millions of consoles sold and only a few primary manufactures, each console by each manufacture looks like all the other consoles sold by that manufacture. Thus, there are few variations in the design of consoles and the number of variations substantially comport with the number of manufactures. Therefore, it would be desirable to provide an individual with the ability to customize his or her console so that each individual can make a more personalized statement.

Furthermore, individuals have a choice in deciding which console they purchase. As game producing companies increasingly offer the same game for all consoles, it would be beneficial to offer features such as an increased ability to customize the look of the console to make the console standout and encourage consumers to select one console over other less customizable consoles.

Heretofore, few individuals have attempted to personalize their gaming console by decorating the console with paint and/or by attaching other accessories. While such attempts have allowed for a more personalized gaming console, the finished look can be less than professional and depends to a great deal on the artistic nature and abilities of the individual doing the decorating. Further, if the entire console is painted a certain amount of skill and care is required and the console is not available while it is being painted or drying. Additionally, if not properly prepared, the personalization can adversely impact the functionality of the console. It would be desirable to provide a means for individuals to readily personalize their console without having to have high levels of artistic ability or suffer less than professional operational and aesthetic results.

BRIEF SUMMARY OF THE INVENTION

In an embodiment, a gaming console includes console body and a face plate that removably attaches to the console body. The face plate has a plurality of openings that can allow for the insertion of media and memory units, for example. The face plate can include spring actuated doors that cover an opening and allow for access to a feature on the console body while providing dust protection. The face plate includes a plurality of retaining clips that allow the face plate to snap into place onto the console body while allowing a user to remove the face plate when desired. In this manner it is possible for a user to readily replace a standard face plate having a standard graphic design with a face plate that has a different graphic design.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

As can be appreciated, consoles suitable for use in playing video games have increased in complexity and processing power. As the processing power has increased, the amount of heat generated by the console has also increased. Thus, consoles are carefully designed to allow for efficient and cost effective removal of heat from the processor and other heat generating components. At the same time, it is desirable to package the console in as small of an area as possible to reduce the footprint of the console. Thus, care must be taken when customizing the appearance of the console so as not to negatively affect the transfer of heat.

Consoles are also designed with many input/output ports and user controls. In keeping with a compact and efficient design, these ports and controls are designed precisely and with shapes and clearances with their mating parts so as to clarify the usage or function of the port or control, to guide the operator, and to provide smooth and trouble free operation over the life of the console.

It should also be noted that gaming consoles are not limited to playing games. Consoles include a powerful processor and are suitable for other types of home entertainment such as playing music and/or movies. Other uses are also possible such as allowing an individual to browse the Internet.

Figure 1:
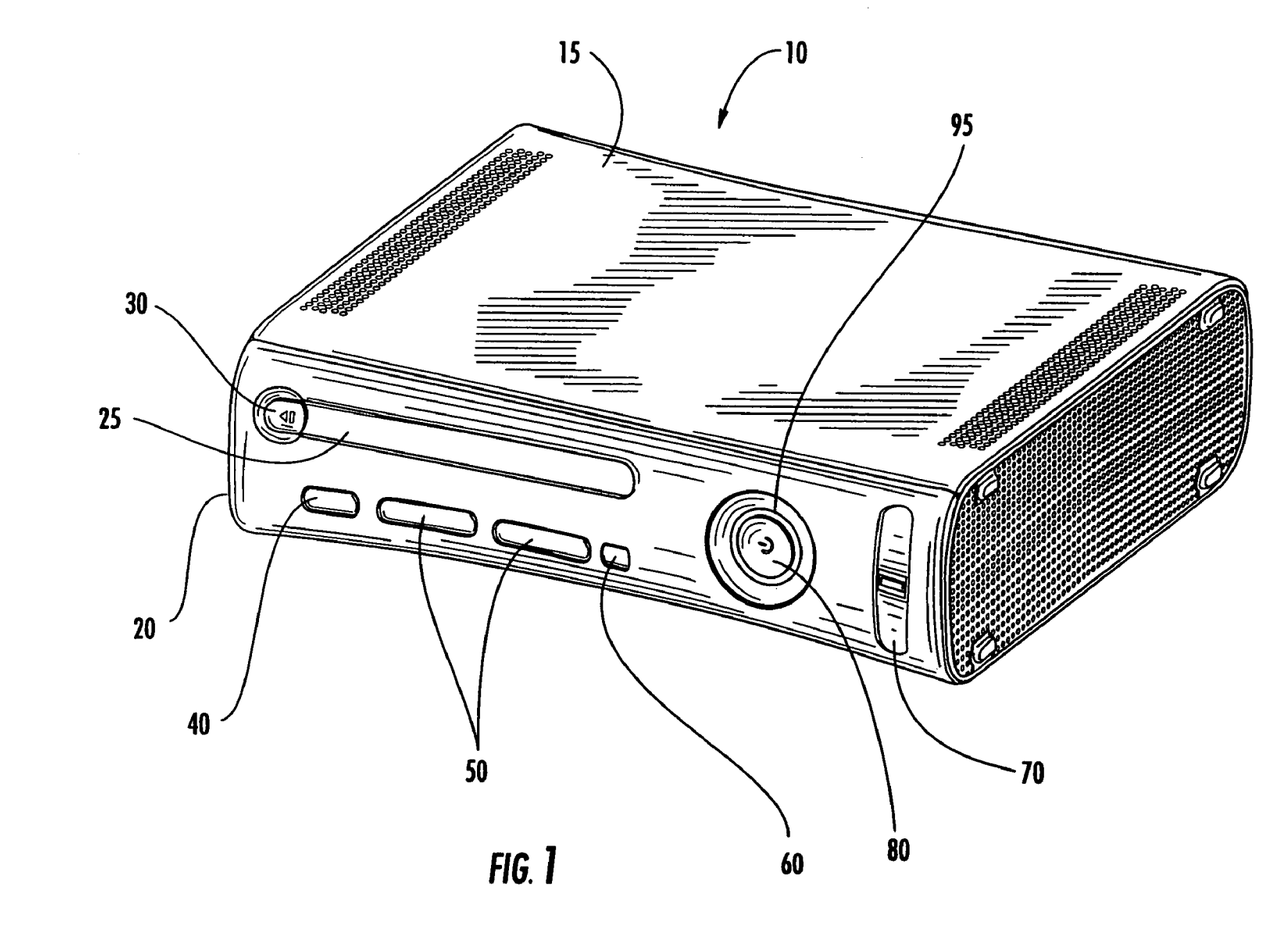
FIG. 1 depicts an isometric view of an embodiment of a console with a face plate attached.

Turning now to FIG. 1, an isometric illustration of an embodiment of a console is shown. The console 10 includes a console body 15 and a face plate 20 (also known as a bezel assembly). As depicted in FIG. 1, the console body 15 includes a DVD tray 25 and a DVD ejection button 30 that can extend through an opening in the face plate 20.

An infrared lens ("IR lens") 40 is located below the DVD tray and is mounted to the face plate 20. The IR lens 40 allows the user to control certain desirable features such as DVD movie playing functionality via a remote control infrared unit (not shown). Naturally, an IR receiver accepts the IR signal and processes it in a known manner so that the desired functionality can be provided.

To the right of the IR lens 40 are two memory unit doors 50 that are also mounted to the face plate 20. The two memory unit doors are mounted side-by-side along a longitudinal axis. The memory unit doors 50 allow a user to connect a memory unit (not shown) to a receptor (not shown) in the console body. In an exemplary embodiment, the memory unit doors are pivotally mounted and the memory unit doors pivot inward so as to allow for the potential of one handed insertion of the memory unit.

To the right of the memory unit doors 50 is a wireless coupling button 60 that is also mounted to the face plate 20. The wireless coupling button 60 can be a button, switch or some other control element. The wireless coupling button 60 allows a user to associate a particular wireless controller with the console. As can be appreciated, the ability to associate a particular controller to a particular console can be a useful feature if multiple wireless controllers are being used for multiple consoles where the controllers and consoles are in reasonably close proximity.

To the far right, two USB game port doors 70 are mounted to the face plate 20. The USB game port doors 70 allow the user to access USB ports on the console body while protecting the USB ports from undesirable dust accumulation.

To the left of the USB game port doors 70, a power button 80 is mounted to the face plate 20. The power button 80 allows the user to turn the console 10 on and off by actuating the power button 80. The power button 80 includes a translucent element 81 that is illuminated when the console is turned on. As depicted, ring of light 95 is disposed around the power button 80. While aesthetically pleasing, it can be appreciated that the power button 80 and the ring of light 95 could be other shapes. For instance, the power button could be square or any other shape. The ring of light 95 could also be square or some other shape and also disposed outside of the power button, for instance in the chamfer area surrounding the power button 80. Further, the shape of the ring of light 95 need not match the shape of the power button 80 and could be mounted on some other area of the face plate 20. Numerous other shapes are possible and such configurations are within the skill of one of ordinary skill in the art.

In an embodiment, the ring of light 95 is configured to include four sectors that can be separately illuminated so that each sector, which corresponds to an individual playing, can be illuminated when that individual is playing. In an embodiment, the ring of light will be illuminated when four individuals are playing. Other combinations are possible, thus a ring of light with 2, 3, 5 or even more sectors is also possible.

It should be noted that the power button 80 is situated some distance from the DVD ejection button 30. This arrangement, while not required, provides advantageous ergonomic benefits to the user. For instance, when using the console in a darkened environment, the user is less likely to accidentally press the wrong button. Thus, there is an advantage to having the DVD ejection button 30 located on one longitudinal side of the DVD tray 25 while locating the power button 80 adjacent the opposite longitudinal side of the DVD tray 25. Thus, in an instance where a game could not fit on a single disk, it would possible for the user to swap disks without the fear of inadvertently pressing the power button 80. Further, locating the DVD ejection button 30 near a side of the face plate 20 allows the user, if desired, to use the side of the console body as an alignment aid when activating the DVD ejection button 30. It should be understood that the above longitudinal orientation could also be reversed and still provide similar functionality.

Figure 2:
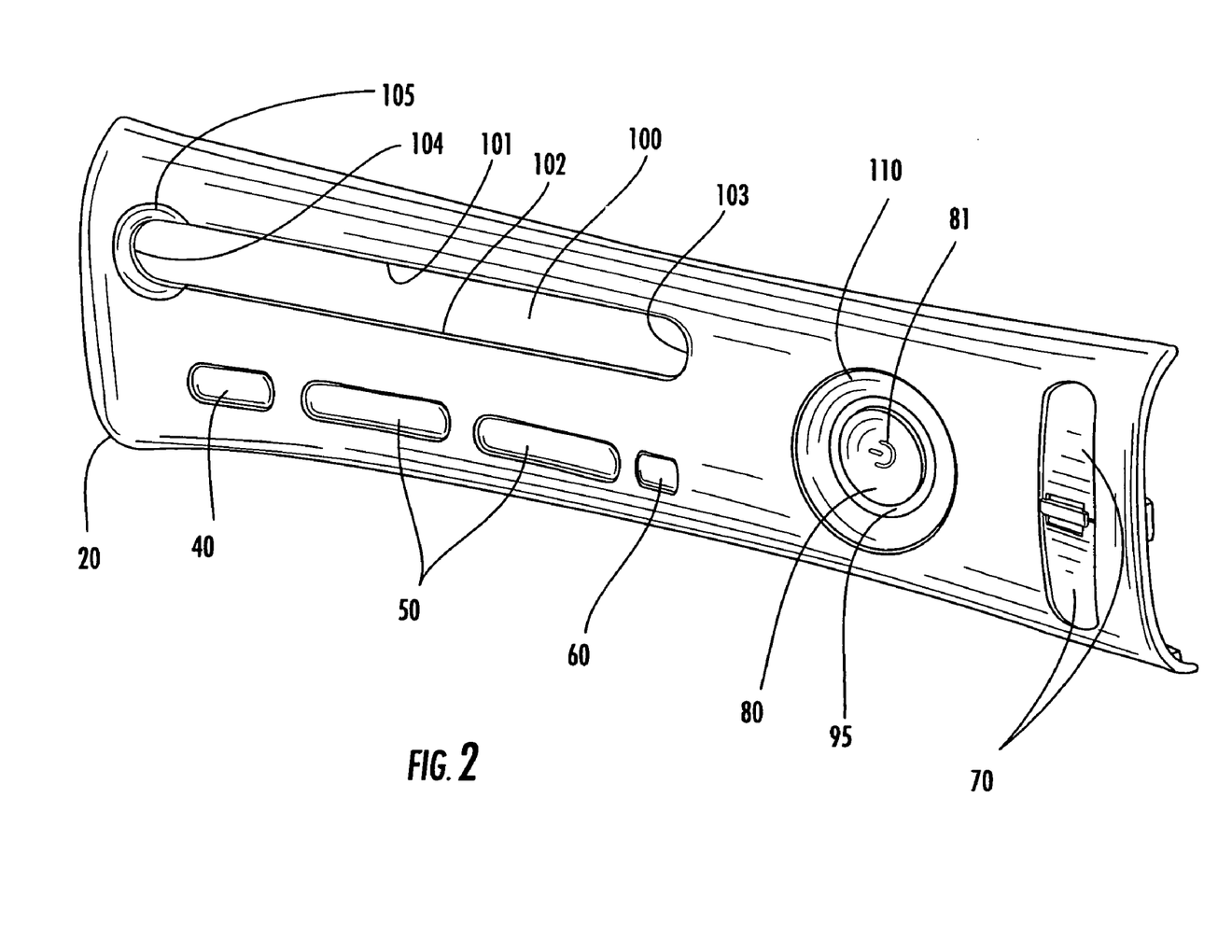
FIG. 2 depicts an isolated isometric view of the face plate depicted in FIG. 1.

Turning now to FIG. 2, an isometric view of the face plate depicted in FIG. 1 is shown. Mounted to the face plate 20 are the IR lens 40, the memory doors 50, the wireless coupling button 60, the USB game port doors 70, the power button 80 and the ring of light 95. As depicted, the DVD tray 25 and DVD ejection button 30, being mounted to the console body, are not part of the face plate 20.

The face plate 20 includes a tray opening 100 defined by the intersection of top side 101, bottom side 102, right side 103 and left side 104, the sides defining a DVD hole. In an exemplary embodiment, the sides 101, 102, 103 and 104 are joined together in a smooth manner that corresponds to the exterior dimensions of the DVD tray 25 and the DVD ejection button 30. Adjacent the left side 104 is a chamfer 105 that is formed in the face plate 20. The chamfer 105 allows for increased ease in locating the DVD ejection button 30 when the face plate 20 is installed. The chamfer can be generally circular in shape except for the region it intersects with the tray opening. The chamfer is located on one longitudinal side of the tray opening opposite the power button 80. The chamfer 105 assists the user by providing visual and tactile clues that aid the user in actuating the DVD ejection button 30. As can be appreciated, the chamfer 105 can be any number of shapes including square, triangular and the like. Thus, the circular shape of the chamfer 105 can be modified as desired.

As depicted, the power button 80 and the ring of light 95 are surrounded by a chamfer 110. The chamfer 110 can provide visual and tactile clues to assist the user in pressing the power button 80 when so desired. As depicted, the chamfer 110 is circular in shape and thus matches the outline of the power button. As can be appreciated, to be effective the shape of the chamfer 110 does not need to match the shape of the power button 80. Thus, in an alternative embodiment not shown, the chamfer 110 could be triangular shaped and the power button 80 could be square shaped. Numerous other variations are possible.

Figure 3:
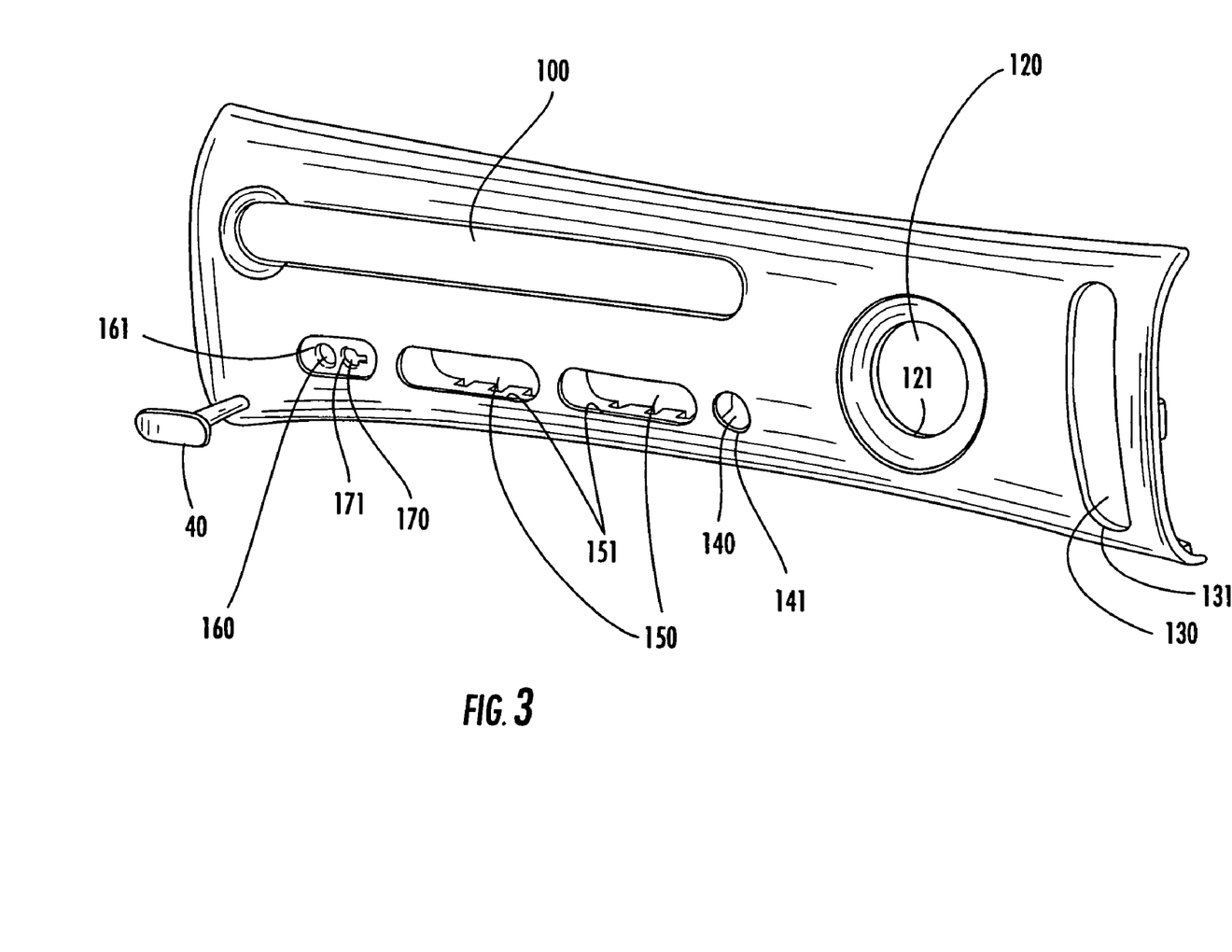
FIG. 3 depicts an isometric view of the face plate in FIG. 2 with the buttons and doors removed.

Turning now to FIG. 3, the face plate of FIG. 2 is illustrated with the doors and buttons and the IR lens 40 removed. In addition to tray opening 100, face plate 20 includes power button opening 120, which is defined by a power button hole 121 in the face plate 20, the power button hole 121 being circular in shape and defining the size of the power button opening 120. As discussed above, power button hole 121 can be other configurations and could define a square shaped opening, for instance.

USB game port opening 130 is defined by USB hole 131 on face plate 20. Likewise, a wireless coupling opening 140 is defined by wireless coupling hole 141. Naturally, the configuration of the respective holes can be modified so as to define different shaped openings as desired.

Memory unit door openings 150 are defined by memory unit holes 151. In an exemplary embodiment, the memory unit holes 151 are configured so that, in a manner discussed below, the memory unit holes 151 aid the user in inserting the memory unit into the appropriate receptor on the console.

Finally, an IR opening 160 and an IR opening 170 provide a location for mounting the IR lens to the face plate 20. The IR opening 160 is defined by a first IR hole 161, the hole being circular in shape. The IR opening 170 is defined by a second IR hole 171 where the second IR hole 171 is key-hole shaped. The lack of symmetry between the IR opening 160 and the IR opening 170 and the corresponding configuration of the IR lens 40 advantageously acts to ensure that the IR lens 40 can only be inserted in the desired orientation. In an alternative embodiment, not shown, the diameter of the IR opening 160 and the IR opening 170 could be different so as to ensure proper orientation. In another exemplary embodiment, the shape of the IR lens 40 could be modified to fit an IR opening with a different shape as desired. Thus, while an IR lens 40 is not required, if provided it should aid in directing IR signals through the face plate 20.

Figure 4:
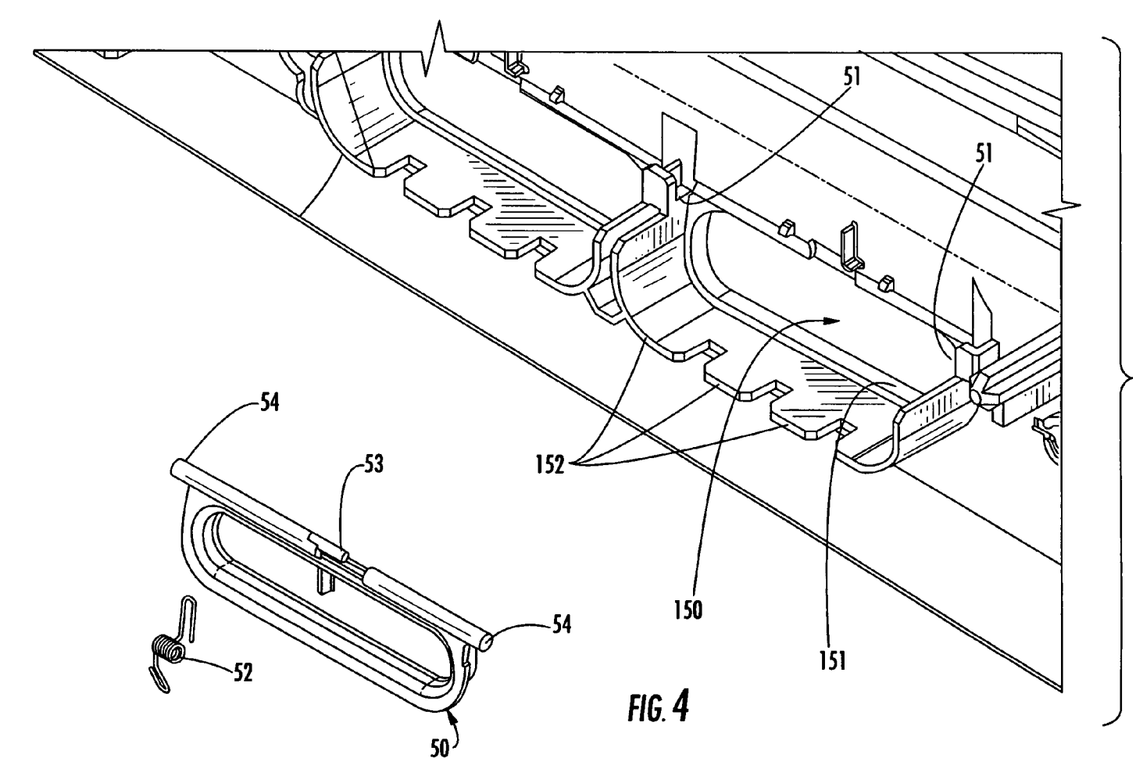
FIG. 4 depicts an isometric exploded rear view of an embodiment of a face plate and a memory unit door.

Turning now to FIG. 4, an exploded isometric rear view of the memory unit opening 150 is depicted. The memory door opening 150 in face plate 20 is formed by the hole 151. A memory unit door extension 152 extends from the rear of the face plate 20. The notches shown in memory unit door extension 152 could be eliminated. The memory unit door extension 152 aids in aligning the insertion of the memory unit, not shown, with the memory unit receptor mounted on the console, also not shown. As the memory unit must be inserted through the memory unit door opening 150, the memory unit door extension 152 can force the memory unit, when inserted, to be properly orientated for insertion into the memory unit receptor. Thus, the hole 151 and the memory unit door extension 152 cooperatively work to assure proper insertion of the memory unit into the memory unit receptor.

To further aid in this alignment, the memory unit door 50 can be pivotally attached to door retaining clips 51. Support arms 54 are positioned in door retaining clips 51. A spring 52, mounted to memory unit door arm 53, biases the memory unit door 50 toward the closed position. Thus, the memory unit door 50 swings upward and, in combination with the memory door extensions 152, aids in aligning the memory unit during insertion so that the user can readily insert the memory unit into the memory unit receptor (not shown) located on the console body 15.

Figure 5:
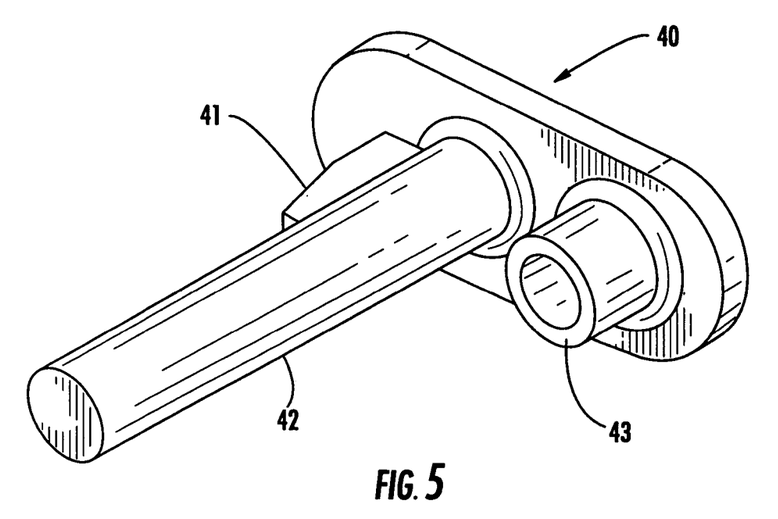
FIG. 5 depicts an isometric rear view of an embodiment of an infrared lens.

Looking next at FIG. 5, a rear isometric view of an embodiment of an IR lens is depicted. IR lens 40 includes a flange 41 that is mounted on lens extension 42 for use in providing alignment during assembly of the IR lens 40 to the face plate 20. IR lens 40 also includes a staking extension 43.

Figure 6:
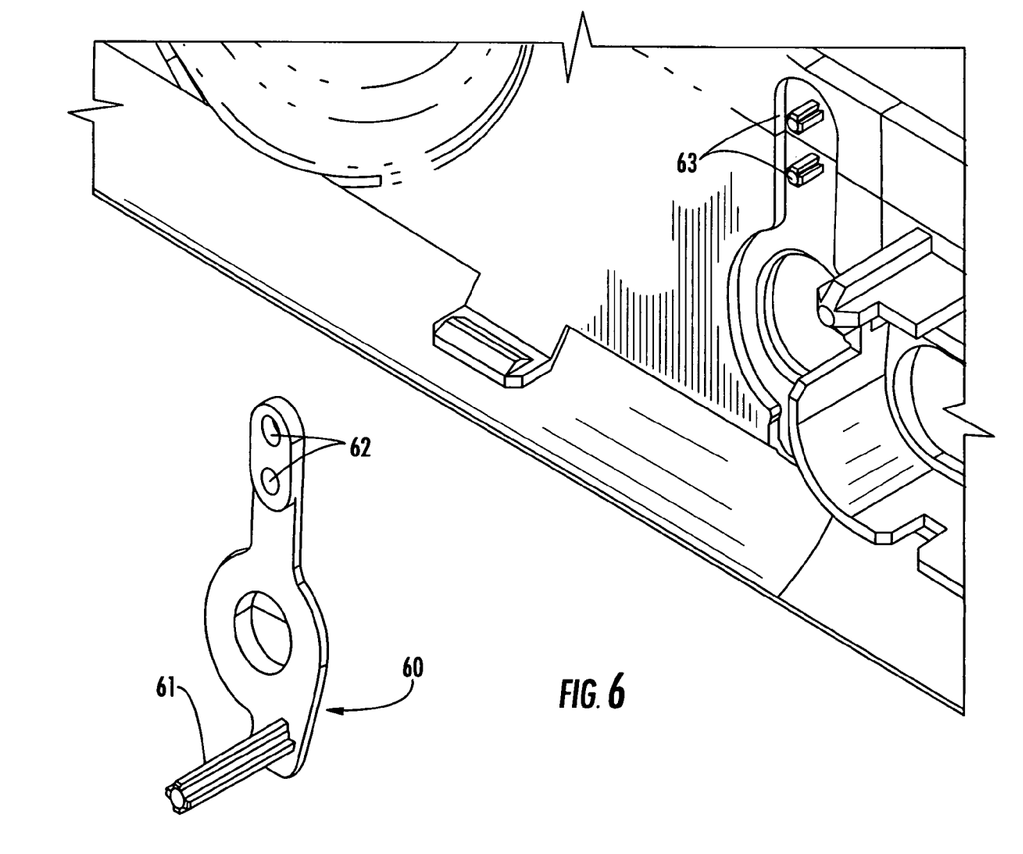
FIG. 6 depicts an exploded isometric rear view of an embodiment of a binding button and the corresponding features of a rear side of a face plate.

Referring now to FIG. 6, wireless coupling button 60 includes a wireless coupling extension 61 that allows the wireless coupling button 60, when pressed, to actuate a coupling switch mounted on the console body 15. Wireless coupling button 60 also includes two openings 62 that mount to wireless coupling staking extensions 63 contained on the face plate 20. Thus, when pressed, wireless coupling button 60 flexes and wireless coupling extension 61 is pressed into the coupling switch (not shown) mounted on the console body 15.

Figure 7:
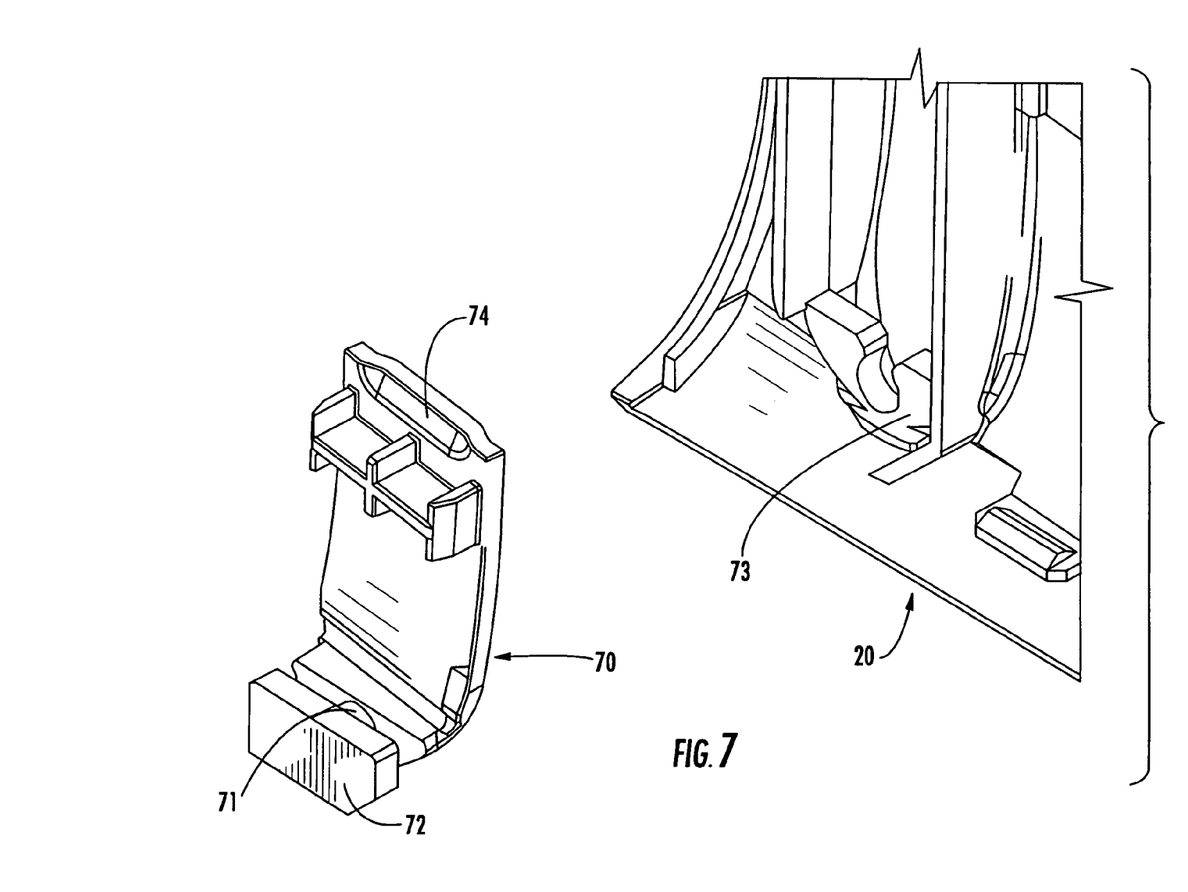
FIG. 7 depicts a partial exploded isometric rear view of an embodiment of an USB door.

Turning to FIG. 7, an exploded view of an embodiment of USB game port door 70 and the associated interface mounted to the rear of face plate 20 is illustrated. USB game port door 70 includes a support axle 71 and a support flange 72. Support axle 71 is configured to pivotally install within USB door receptacle 73. Thus, USB game port door 70 is configured to mount support axle 71 on USB door receptacle 73. In operation, the user can pull on lip 74 and then pivot USB game port door 70 out of the way so that a USB port located on the console body can be accessed.

In an alternative embodiment, the USB game port door 70 can be a one piece door that can be removed from the face plate 20 and can be prevented from becoming separated from the face plate 20 with a lanyard. In an alternative exemplary embodiment, the USB game port door 70 can simply slide out of the way, preferably into a recess in the face plate 20 that is configured to receive the USB game port door 70. While other designs are possible, it is preferable that the USB game port door 70 cover the USB ports when the ports are not in use while still allowing ready access to the USB ports when so desired. Thus, in a first position, USB game port door 70 blocks access to the USB ports located on the console body and in a second position the USB game port door does not block access to the USB ports. It should be noted that while referred to in the plural, if included there may be one or more USB ports.

Figure 8:
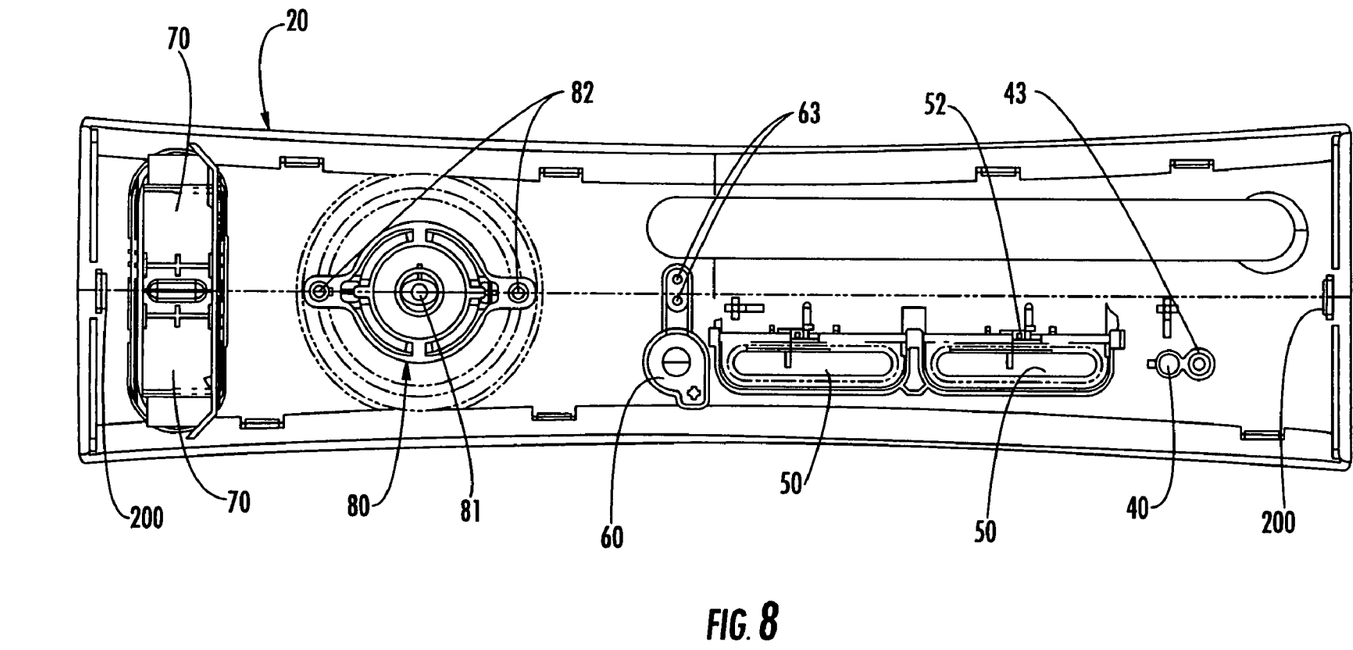
FIG. 8 depicts a rear view of an embodiment of a face plate with the doors and buttons attached.

Referring now to FIG. 8, a rear view of an embodiment of the face plate 20 with the doors and buttons installed is provided. Clips 200 are configured to support and fasten face plate 20 to the console body 15. In an embodiment, the clips 200 flex during installation of the face plate 20, the clips 200 being configured to engage a retaining feature on the console body in a known manner.

Power button 80 is mounted onto power button staking extensions 82 and includes a power button extension 81 that allows the power button 80, when depressed, to actuate a power switch located on the console body. In an embodiment the power button 80, the wireless coupling button 60 and the IR lens 40 can all be staked to face plate 20 via power button staking extensions 82, wireless coupling staking extensions 63, and IR staking extension 43, respectively. Naturally, it is also possible to attach the power button 80, the wires coupling button 60 and the IR lens 40 with other known methods of attachment such as using fasteners or adhesives. However, the use of staking allows for a cost effective method of attachment while minimizing the number of parts and/or the need to apply a coat of adhesive.

Referring to both FIG. 3 and FIG. 8, it can be appreciated that opening 140, openings 150, opening 160 and opening 170 are aligned so as to form a longitudinal axis that is substantially parallel to the longitudinal axis formed by the tray opening 100. Thus, the location of the DVD ejection button 30 is located on a first longitudinal axis formed by the tray opening 100 while the wireless coupling button 60 is located on a second longitudinal axis formed below the first longitudinal axis; the first and second axis's being substantially parallel. Having a first and a second longitudinal axis provides additional visual clues to the user of the console so that only the desired button or switch is actuated. Locating the DVD ejection button 30 and wireless coupling switch 30 on opposite positions along the two substantially parallel axis's further reduces the chance of an inadvertent pressing of either the ejection button 30 or the wireless coupling button 60.

Furthermore, locating the first longitudinal axis, along which the tray opening 100 extends, above the second longitudinal axis aids in the operation of the console 10. When the DVD tray 25 is extended, the wireless coupling button 60 is located below the DVD tray 25 so that the wireless coupling button 60 is less likely to be actuated when a disk is placed in the DVD tray 25. Therefore, the alignment of the first longitudinal axis above the second longitudinal axis reduces user error and provides improved ergonomics. As can be appreciated, the improved ergonomics provided by the face plate organization is beneficial for individuals who have relatively lower levels of control over the movement of their hands or during gameplay in a darkened room.

Figure 9:
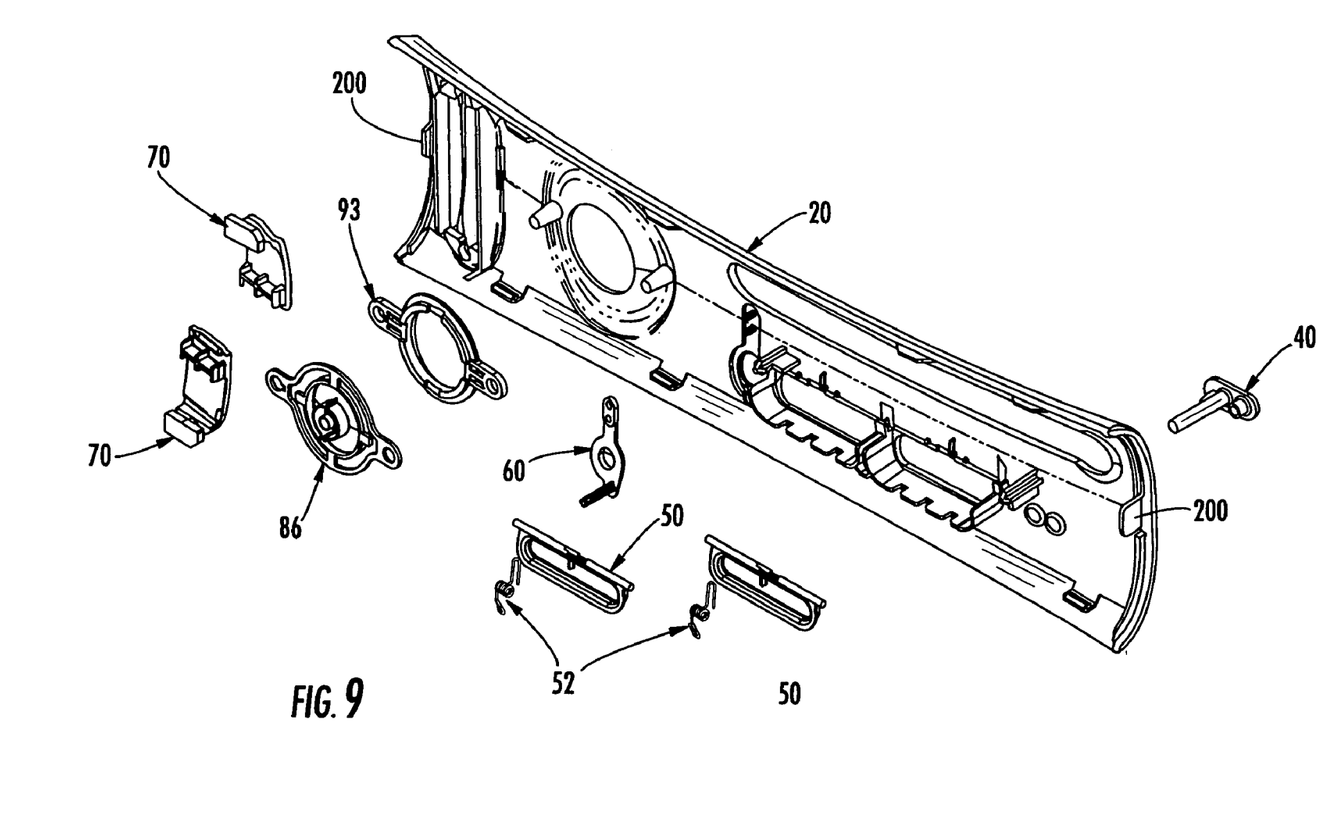
FIG. 9 depicts a partial exploded view of the embodiment depicted in FIG. 8.

Turning to FIG. 9, an isometric partially exploded view of the back of the face plate 20 and the installed components is provided. Face plate 20, as shown, includes two clips 200. The clips 200 can flex during installation and thus allow the face plate 20 to be readily installed or removed from the console body 15 while providing sufficient retaining force so that the face plate 20 does not become disengaged from the console body 15 without the application of force by the user.

On one longitudinal side (i.e. the left as depicted) two USB game port doors 70 are configured to pivotally mount to the face plate 20. A second alignment opening (not shown) can be placed on the console body between the USB game port opening 130 and the USB port on the console so as to assist the user in properly inserting the USB connector into the USB port.

In an embodiment, the power button 80 includes a translucent ring 93 that provides the structure for the ring of light 95. The translucent ring 93 is mounted over the power button staking extensions 82. Flexible element 86 mounts on top of translucent ring 93. Flexible element 86, when fastened to face plate 20, holds translucent ring 93 in position and provides a spring-like response to when the power button 80 is pressed by the user.

Figure 10:
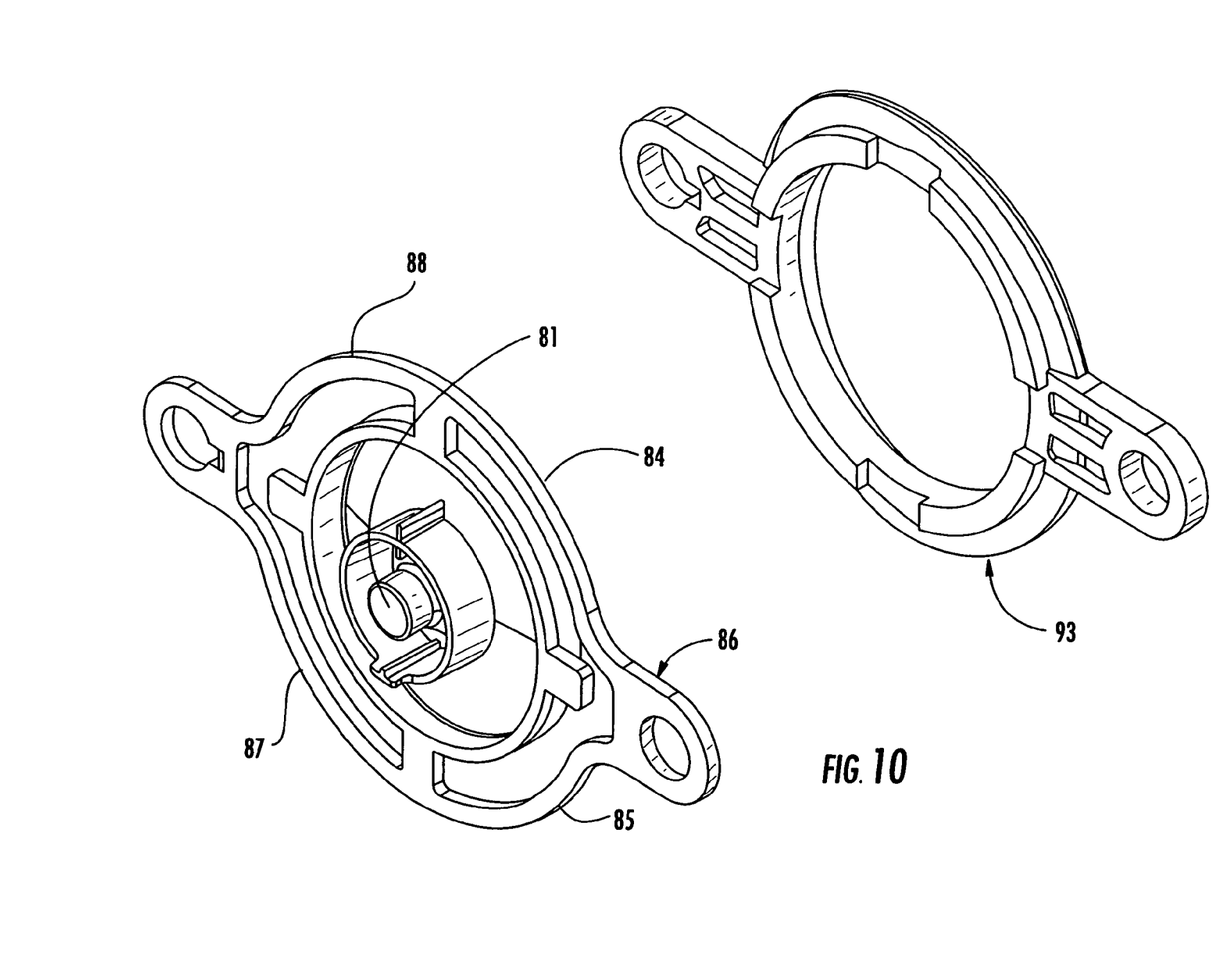
FIG. 10 depicts an exploded isometric view of an embodiment of a power button.

Next, FIG. 10 depicts an exploded isometric view of an embodiment of a power button 80. As depicted, power button extension 81 is provided on flexible element 86 for interfacing with a switch located on the console body, the power button extension 81 initially in an at rest position. When a user presses on power button 80, the exerted force tends to cause power button extension 81 to translate toward an activating position. In the process, spring elements 84, 85, 87 and 88 elastically deform. When the force is removed, the spring elements cause the power button extension 81 to move back to the at rest position.

Figure 11:
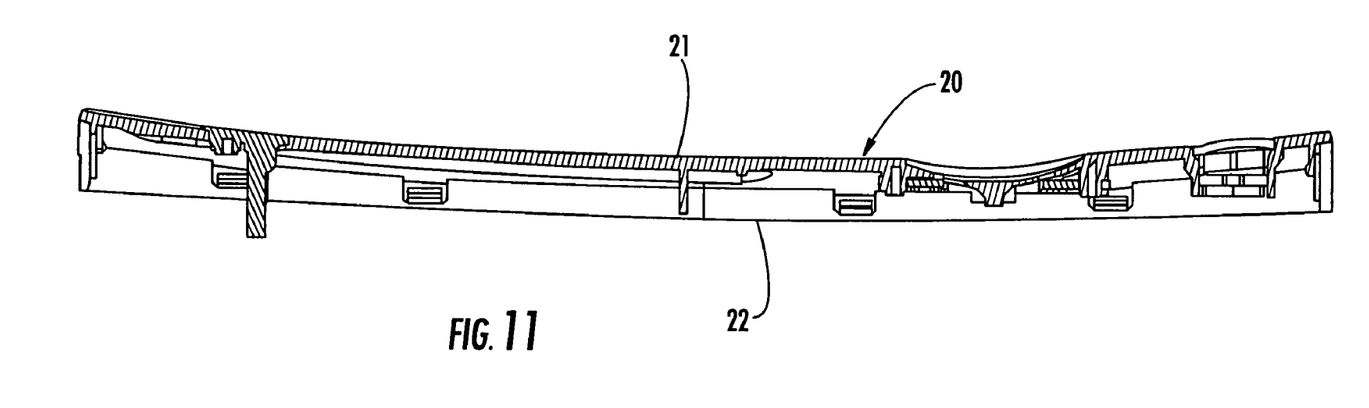
FIG. 11 depicts a partial sectional view of an embodiment of a face plate.

Referring to FIG. 11, a cross-sectional view of face plate 20 is provided. As can be appreciated, the face plate 20 has a certain radius. Thus, the front 21 of face plate 20 is concave about a center latitudinal axis. Conversely, the rear 22 of face plate 20 is convex about the center latitudinal axis. However, as is apparent from FIG. 3, the front 21 of face plate 20 is also convex about a center longitudinal axis and the rear 22 of face plate 20 is concave about the center longitudinal axis. Thus, the front 21 of face plate 20 has a compound curved surface.

The curvature of the front 21 of the face plate 20 about the latitudinal axis helps focus the user's attention on the console. The curvature of the front 21 about the longitudinal axis helps make the console 10 look sleeker and more fashionable. Thus, while a particular radius is not crucial and the use of a spline rather than a pure radius is acceptable, the use of a curved front surface in general provides certain aesthetic benefits to the console 10 that make the console 10 more attractive and therefore more desirable. Naturally, the front 21 of the face plate 20 could be modified as desired so long as the rear 22 of the face plate 20 is configured to match the console body 15.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A face plate for removably mounting to a console body, the face plate having left, right, upper, and lower sides and comprising:
    a tray opening defined by a DVD hole adjacent the left and upper sides of the face plate and generally longitudinally extending between the left and right sides of the faceplate, the DVD hole including a top side, a bottom side, a first longitudinal side and a second longitudinal side;
    a power button opening defined by a power button hole adjacent the tray opening and generally to the right thereof, the power button opening located near the second longitudinal side of the tray opening;
    a power button configured to be assembled to the power button opening;
    an IR opening in the face plate defined by an IR hole adjacent the tray opening and generally beneath and toward the first longitudinal side thereof and also adjacent the lower side of the face plate, an IR lens mounted to the IR opening;
    a first memory unit opening in the face plate defined by a first memory unit hole adjacent the IR opening and generally to the right thereof and also adjacent the lower side of the face plate;
    a coupling opening in the face plate defined by a coupling hole adjacent the first memory unit opening and generally to the right thereof and also adjacent the lower side of the face plate, a wireless coupling button mounted to the coupling opening; and
    at least one clip mounted to a rear side of the face plate, the at least one clip configured to allow of installation and removal of the face plate without the need for tools.

2. The face plate of claim 1, wherein the tray opening defines a first longitudinal axis and a second longitudinal axis, substantially parallel to the first longitudinal axis, is defined by the IR opening, the first and second memory door openings and the coupling opening, the second longitudinal axis positioned below the first longitudinal axis.

3. The face plate of claim 2, further comprising a second memory unit opening in the face plate defined by a second of memory unit hole; wherein a first memory unit door and a second memory unit door are pivotally mounted adjacent the first and second memory unit openings respectively, the first and the second memory unit doors being pivotally mounted to the face plate, the first and second memory unit doors being biased towards a closed positioned by a first spring and a second spring, respectively.

4. The face plate of claim 3, wherein the face plate includes a DVD chamfer located adjacent the first longitudinal side of the tray opening, the face plate further including a power button chamfer located about the power button opening.

5. The face plate of claim 4, wherein a front of the face plate is convex about a center longitudinal axis and the front of the face plate is concave about a center latitudinal axis.

6. The face plate of claim 5, wherein the face plate includes a second IR opening defined by a second IR hole, wherein the IR lens is configured to mount to the first and second IR openings in a manner so as to control the orientation of the IR lens.

7. The face plate of claim 6, further comprising a USB game port opening defined by a USB game port hole, wherein a USB game port door is configured to mount to the USB game port opening, the USB game port door being configured to allow ready access to a USB port on the console body.

8. A face plate for mounting on a console body, the face plate having a front side and a rear side, the face plate also having left, right, upper, and lower sides and comprising:

a tray opening defined by a DVD hole comprising a top side, a bottom side, a right side and a left side, the tray opening being adjacent the left and upper sides of the face plate and generally longitudinally extending between the left and right sides of the faceplate;

a power button opening defined by a power button hole adjacent the tray opening and generally to the right thereof;

a USB game port opening defined by a USB game port hole adjacent the power button opening and generally to the right thereof;

a first memory unit opening defined by a first memory unit hole and a second memory unit opening defined by a second memory unit hole, the first and second memory unit openings being located below the tray opening;

a first IR opening defined by a first IR hole adjacent the tray opening and generally beneath and toward the first longitudinal side thereof and also adjacent the lower side of the face plate, the IR opening being located adjacent the first memory unit opening and generally to the left thereof;

a coupling opening defined by a coupling hole, the coupling opening being located adjacent the second memory unit opening and generally to the right thereof and also adjacent the lower side of the face plate; and a first clip mounted to the rear of the face plate; whereby the first clip is configured to allow the face plate to removably mount to the console body.

9. The face plate of claim 8, further comprising a second clip mounted to the rear of the face plate, whereby the first and second clips are configured to cooperatively hold the face plate to the console body so as to allow the face plate to removably mount to the console body.

10. The face plate of claim 9, further comprising a DVD chamfer and a power button chamfer, the DVD chamfer being adjacent the left side of the DVD hole and the power button chamfer adjacent the power button hole.

11. The face plate of claim 8, further comprising at least one first memory unit extension mounted to the rear of the face plate adjacent the first memory unit hole, and at least one second memory unit extension mounted to the rear of the face plate adjacent the second memory unit hole.

12. The face plate of claim 11, further comprising a second IR opening defined by a second IR hole, the second IR opening located adjacent the first IR hole.

13. The face plate of claim 12, further comprising:

an IR means for directing infrared light through the face plate;

a plurality of memory unit means for allowing, in operation, the user to access a memory receptor located on the console body;

a binding means for allowing, in operation, the user to actuate a binding switch located on the console body;

a power means for allowing, in operation, the user to actuate a power switch located on the console body;

a USB game port door mounted to the face plate and configured to prevent access to a USB game port opening when in a first position.

14. The face plate of claim 8, wherein the front surface of the face plate is curved.

15. A console for use in playing video games, comprising:

a console body, the console body including a DVD tray, a DVD ejection button, and a power switch;

a face plate configured to removably mount to the console, the face plate including a front side and a rear side, the face plate also having left, right, upper, and lower sides and further comprising:

at least one clip mounted on the rear side of the face plate, wherein the at least one clip is configured to releasably mount the face plate to the console body;

a tray opening defined by a DVD hole adjacent the left and upper sides of the face plate and generally longitudinally extending between the left and right sides of the faceplate, the tray opening configured to allow the user to access the DVD ejection button and to further allow the DVD tray to extend through the face plate; and a power button mounted to the face plate to the right of the DVD hole and generally adjacent thereto, the power button being generally centered between the upper and lower sides of the face plate and configured so that, in operation, a user can press the power button and actuate the power switch.

16. The console of claim 15, wherein the face plate further comprises an IR lens mounted to an IR opening in the face plate, the IR lens configured to allow IR light to pass through the face plate.

* * * * *